United States Patent [19]
Hayashi et al.

[11] Patent Number: 5,517,559
[45] Date of Patent: May 14, 1996

[54] APPARATUS FOR AND METHOD OF VERIFYING SERVICE USER'S INFORMATION

[75] Inventors: Hitoshi Hayashi; Senji Kuroki; Masayuki Honma; Naoki Abe, all of Yokohama; Akira Orita, Kawasaki, all of Japan

[73] Assignee: Fujitsu Limited, Kawasaki, Japan

[21] Appl. No.: 125,124

[22] Filed: Sep. 22, 1993

[30] Foreign Application Priority Data

Sep. 22, 1992 [JP] Japan .................... 4-251731

[51] Int. Cl.⁶ .......................... H04M 15/00; H04M 1/64; H04M 17/00; H04M 3/00
[52] U.S. Cl. .................. 379/112; 379/114; 379/115; 379/67; 379/88; 379/144; 379/189
[58] Field of Search ................ 379/91, 95, 112, 379/114, 115, 121, 144, 189, 198, 199, 88, 89, 67; 340/825.31, 825.34

[56] References Cited

U.S. PATENT DOCUMENTS

| | | | |
|---|---|---|---|
| 4,757,525 | 7/1988 | Matthews et al. | 379/198 X |
| 4,951,308 | 8/1990 | Bishop et al. | 379/144 X |
| 5,046,183 | 9/1991 | Dorst et al. | 379/144 X |
| 5,274,695 | 12/1993 | Green | 379/91 X |
| 5,313,463 | 5/1994 | Gore et al. | 379/91 X |

FOREIGN PATENT DOCUMENTS 57-23358  2/1982  Japan .

*Primary Examiner*—Stephen Chin
*Assistant Examiner*—Paul Loomis

[57] ABSTRACT

An apparatus for verifying service user's information consists of a switch system for setting a call between one terminal and the other terminal and a data memory connected to this switch system. This data memory stores information indicating the number of a service user on which a charge previously applied by a subscriber is imposed and information on a validity of this service user's information. The switch system includes a checking section. The checking section checks at first effects, when the subscriber requests setting of a call to be charged for a talk on the basis of the above-mentioned information from one terminal, a formal check of the service user's information sent with the request by the subscriber. If this formal check is passed, the checking section requests the data memory for a collation as to whether or not the service user's information is valid. Then, only when receiving a reply saying that the service user's information is valid, the switch system sets the call between one terminal and the other terminal.

30 Claims, 6 Drawing Sheets

APPARATUS FOR AND METHOD OF VERIFYING SERVICE USER'S INFORMATION

BACKGROUND OF THE INVENTION

1. Field of the Invention

The present invention relates generally to an accounting service in an switching network in which a call originating party or other specific third party is charged for using the switching network on the basis of individual information other than a telephone number of an call originating terminal when the call originating party uses the switching network such as a telephone network or the like. This invention relates more particularly to an apparatus for and method of verifying service user's information.

2. Related Background Art

In recent years, there have almost been actualized switching network services. In the switching network services, when a call originating party employs an switching network through a call originating terminal such as a telephone, a facsimile and a modem, the originating party designates ID information such as ID numbers including a credit card number and a banking deposit account number, a telephone number other than a telephone number of the originating terminal, e.g., a telephone number of the originating party's own telephone subscribed and others (these items of information are hereinafter generally termed [service user's information]). The originating party is thereby allowed to post-pay the charge for using the switching network.

In this type of switching network, the service user's information designated by a subscriber is registered and managed in concentration on one database. When requesting the switching network for setting a call through the above-mentioned switching network services, it is required that a validity of the service user's information is verified.

FIG. 7 is a view illustrating a part of a conventionally existing switching network. The switching network shown in FIG. 7 supplies the subscriber who made a contract for using the network with credit card call services in which a credit card number is designated as a service user's number. In the credit card call services, a call for designating the credit card number is referred to as a credit card call.

Referring to FIG. 7, the switching network includes a plurality of local switches (LS) (2) connected respectively to a plurality of originating terminals (1).

Further, for supplying the credit card call services, this switching network is equipped with one or a plurality of toll switches (TS) (3) connected to the plurality of local switches (2) and only one database node (DBN) (4) connected to all the toll switches (TS) (3).

The database node (DBN) (4) includes a database memory (DB) (41) and a collating section (42). This database memory (DB) (41) stores items of information for verifying validity of the credit card of a subscriber (1) who makes a request for utilizing the credit card call services, such as a credit card number, a password number thereof, a validity term thereof and an inhibition-of-use treatment.

Referring again to FIG. 7, it is supposed that a subscriber who desires to set the credit card call performs calling through the originating terminal (1) and dials the credit card number and the password number in accordance with predetermined procedures. Then, the toll switch (3) transfers the credit card number and the password number received via the local switch (2) to the database node (4).

The collating section (42) in the database node (4) executes a format check as to whether or not the transferred credit card number satisfies a predetermined format. Next, the collating section (42) checks whether or not the credit card number and the password number are previously registered in the database memory (41). Next, the collating section (42) checks the validity as to whether or not the credit card number is within the validity term and does not receive the stop-of-transaction treatment. Thereafter, the database node (4) sends the checked result back to the toll switch (3). The toll switch (3), if this checked result is negative, sends a connection reject message for rejecting setting of the credit card call back to the originating terminal (1). Whereas if the checked result is affirmative, the toll switch (3) requests the originating terminal (1) for sending a telephone number of the remote terminal which is necessary for setting the call between the remote terminal and the originating terminal.

When requested for sending the telephone number of the remote terminal, the subscriber transmits a receive telephone number in the form of a push-button signal via the originating terminal (1). Then, the toll switch (3) performs known procedures for setting the call between the receiving terminal and the originating terminal.

As apparent from the discussion given above, in the verification of the service user's information in the accounting services executed in the conventional switching network, the sole database node (4) is made to execute all the format check of the credit card number sent by the subscriber requesting the credit card call through the originating terminal (1) and the check about the validity thereof. For this reason, the load is concentrated on the database node (4). Namely, its throughput to be performed increases. Consequently, there arises a problem in which the database node (4) is incapable of quickly sending the result of the check back to the toll switch (3). Further, for the same reason, if the collated result can not be sent back to the toll switch (3) because of a trouble produced in the database node (4), the switching network can not provide the credit card call services.

Note that the credit card number has a large number of digits, and, hence, there increases a possibility that the subscriber is to send a wrong credit card number. Accordingly, assigning the format check of the credit card number to the database node (4) may be a factor for the concentration of load particularly on the database node (DBN).

SUMMARY OF THE INVENTION

It is a primary object of the present invention to actualize an switching network capable of quickly certainly setting a service call to be charged based on service user's information previously designated by a subscriber.

According to one aspect of the present invention, there is provided an apparatus for verifying the number of a service user to be charged in an switching network comprising: a switch system for setting a call requested by one terminal between other terminal and the one terminal; and a data memory, connected to this switch system, for retaining service user's information previously designated by a subscriber and information on a validity of the service user's information. The data memory includes a collating means for collating the validity of the service user's information. The switch system also includes a checking means for checking whether or not the service user's number transmitted via the one terminal satisfies a predetermined formal condition and requesting, if the condition is satisfied, the data memory for the collation of the validity of the service user's number. Then, the switch system sets, when the collating means recognizes the validity of the service user's number, a call to be charged based on the service user's information between one terminal and the other terminal.

The present invention can be, as will hereafter be shown, embodied in a variety of forms.

To start with, one terminal as a call originating terminal is applicable to a telephone, a facsimile, a telex and an interface such as a modem connected to a computer. This one terminal may belong to a possession of the call originating party or may be a public telephone or may be belong to a possession of others excepting the originating party. Besides, one terminal may have a peculiar telephone number.

Next, the remote other terminal to which the call is set includes, as a matter of course, the terminals of the above-mentioned types and, besides, even the terminal of the switching network supplier's own such as some information service. The other terminal further includes a terminal connected through another switching networks such as overseas telephone networks.

Moreover, the switching network includes, in addition to ordinary analog telephone networks, all kinds of switching networks such as ISDN, a packet switching network, a frame switching network, VAN or the like.

The charges to be imposed include, in addition to the charges for using the lines, charges for utilizing added value information services, etc.

As the service user's information previously designated by the subscriber and registered in the data memory may be used the items of ID information such as financial numbers including a credit card number, a deposit account number, etc., a telephone number other than the telephone number imparted to the originating terminal (e.g., a subscriber's number or a telephone number of his or her own), and other ID information containing characters other than numerals. In short, the service user's information may be an information which enables a subscriber specified as the call originating party to be charged for services supplied from all subscribes on the basis of itself when a call is set.

The subscriber uses the credit card number as a piece of service user's information previously designated by the subscriber and registered in the data memory. In this case, one terminal as an originating terminal may be equipped with a card number reader.

There is no restriction in terms of the number of switch systems incorporating the above-described function in the switching network. Further, the switching network may be constructed of switch systems having no such function in addition to the switch systems incorporating the function described above. The switch system which does not incorporate this function may be arranged to relay a signal by connecting the terminal to the switch system having the above-stated function.

Only one data memory provided in the switching network is desirably connected to all he switch systems having the above-mentioned function in terms of one-way management of the data. If the switching network is extended on a large scale, however, a plurality of data memories may be prepared in the switching network.

The data memory does not necessarily belong to a possession of the switching network supplier. For example, as in the case of the database in a credit card company, the data memory may be accessed through the switching network. In this connection, the term [subscriber] as employed in the present invention is not confined to the party establishing the contract with the switching network supplier. The subscriber may be, as in the case of a credit card membership, a party registered on the database accessible via the switching network.

The formal condition of the service user's information is, it can be considered, that the number of the character of the information is same as the predetermined number, that the information does not contain inhibition-of-use characters, or that the information satisfies a format based on IS0-7812 pursuant to CCITT (International Telegraph and Telephone Consultative Committee) Recommendation E118, etc.

Further, the information on the validity of the service user's information retained by the data memory includes, in addition to the information provided by the subscriber himself or herself such as a password number, items of information provided by the third party such as a validity term and a usable limit amount of the credit card and an inhibition-of-use treatment.

According to another aspect of the present invention, there is provided a method of verifying service user's information in accounting services of an switching network employing the above-mentioned apparatus. The switching network comprises a switch system for setting a call requested by one terminal between other terminal and the one terminal. The switching network also comprises a data memory for retaining service user's information previously designated by a subscriber and information on a validity of the service user's information. In this switching network, at the first onset, the switch system checks whether or not the service user's information sent from the one terminal satisfies a formal condition. Next, the data memory collates the service user's information on the basis of the data retained on the data memory when the service user's information satisfies the predetermined formal condition as a result of the check. Subsequently, the switching network sets a call to be charged based on the aforementioned information between one terminal and the other terminal when recognizing that the service user's number is previously retained on the data memory and has a validity as a result of the collation.

Note that the checking means may request, if the service user's information does not satisfy the format, the call originating subscriber for resending the service user's information.

Further, the checking means permits setting of a call for request of the call in which the service user's information satisfies the format and that are produced within a predetermined elapse time since the collating means incorporated into the data memory has stopped functioning.

The checking means also permits setting of a call for request of the call in which the service user's information satisfies the format in the order of arrival till a predetermined number is reached with respect to the set call in the case that the collating means incorporated into the data memory has stopped functioning.

The checking means also transfers the service user's information passing the format check to the data memory together with the password number sent from the originating subscriber and requests the collation thereof. The collating means may perform the collation as to whether or not the information is valid for supplying the services by use of the service user's information and the password number that are transferred from the switch system.

According to the apparatus for and method of verifying the information of the service user to be charged in the above-constructed switching network according to the present invention, there is effected the check as to whether or not the service user's information transmitted by the subscriber as an originating party satisfies the predetermined formal condition. This check is executed on the side of the switch system. Hence, there is no necessity for checking this formal condition on the side of the data memory. Further, it is enough to check the validity of the information selected by the formal condition check by retrieving the database. For this reason, the load on the data memory, i.e., a throughput thereof, is reduced. It is therefore possible to remarkably decrease the time for setting the call concomitant with such services and also improve the capacity of the switching network as a whole.

Besides, even when the data memory stops functioning due to some trouble, the switch system is capable of checking the formal condition of the service user's information transmitted by the subscriber as the originating party. Accordingly, if the setting of the call would be permitted within a fixed range with respect to the request for the call in which the service user's information meets the predetermined format, the services could be provided to some extent, and the serviceability of the switching network could be therefore maintained.

Additionally, if the switch system judges that the service user's number transmitted by the subscriber as the originating party does not satisfy the predetermined formal condition, the originating terminal would be requested to resend the service user's number. With this action, the originating party could quickly know a mistake in sending this number.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENT

A preferred embodiment of the present invention will hereinafter be described with reference to the drawings.

Figure 1:
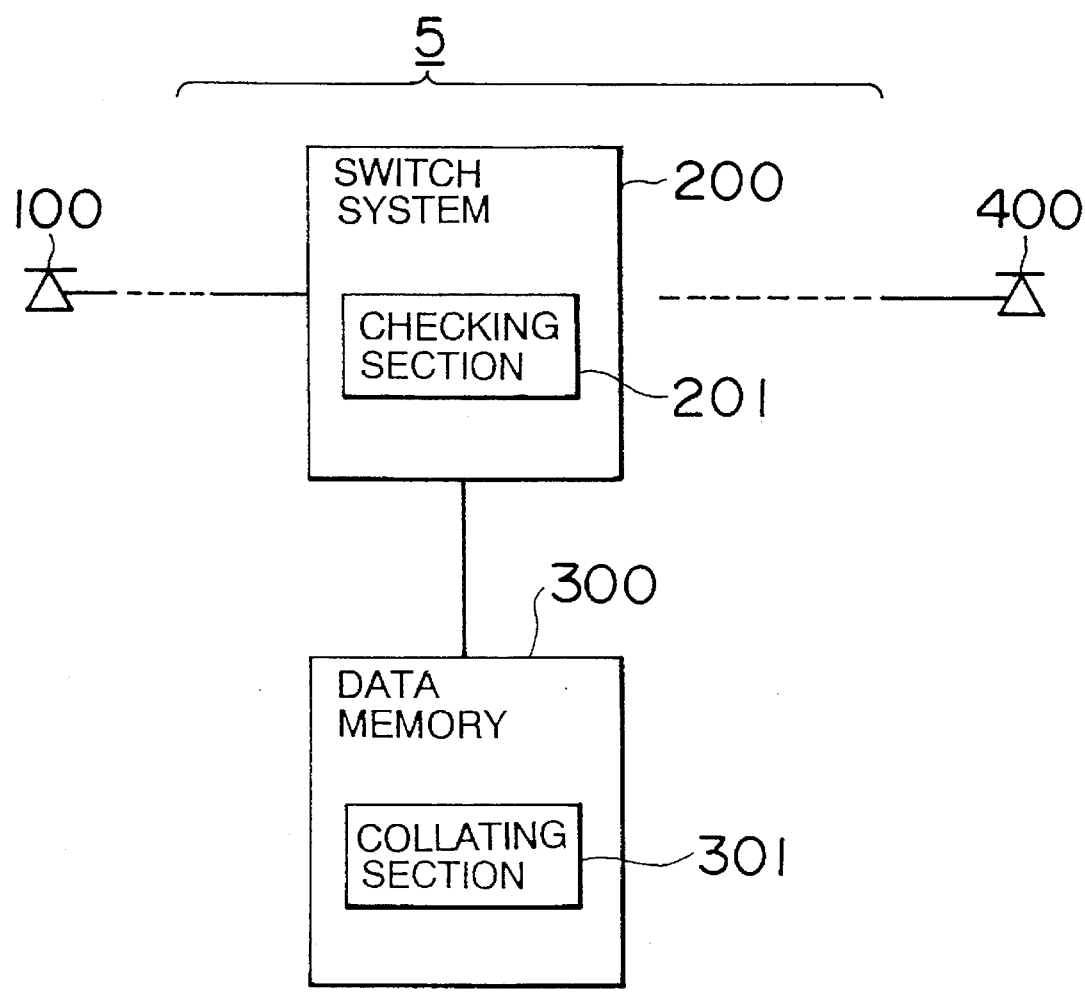
FIG. 1 is a block schematic diagram illustrating an switching network in one embodiment of this invention.

FIG. 1 is a block schematic diagram view of the present embodiment but illustrates an apparatus for verifying service user's information. A subscriber designates a credit card number as a piece of ID information on the service user charged for a call through this apparatus. Based on this credit card number, the subscriber having a contract is provided with "credit card call services", wherein the subscriber pays charges for the call to a service supplier of an switching network (5) through a credit card company.

The apparatus for verifying the service user's information in this embodiment illustrated in FIG. 1 is constructed of a switching system (200) and a data memory (300). The switching system (200) sets a call requested by one terminal (100) between the other terminal (400) and one terminal (100). The data memory (300) is connected to this switching system (200). The data memory (300) retains pieces of information on the credit card number designated beforehand by the subscriber and on a validity of this credit card number.

The data memory (300) includes a collating section (301) for collating the validity of the credit card number. The switching system (200) also includes a checking section (201) for checking a formal condition of the credit card number.

Figure 2:
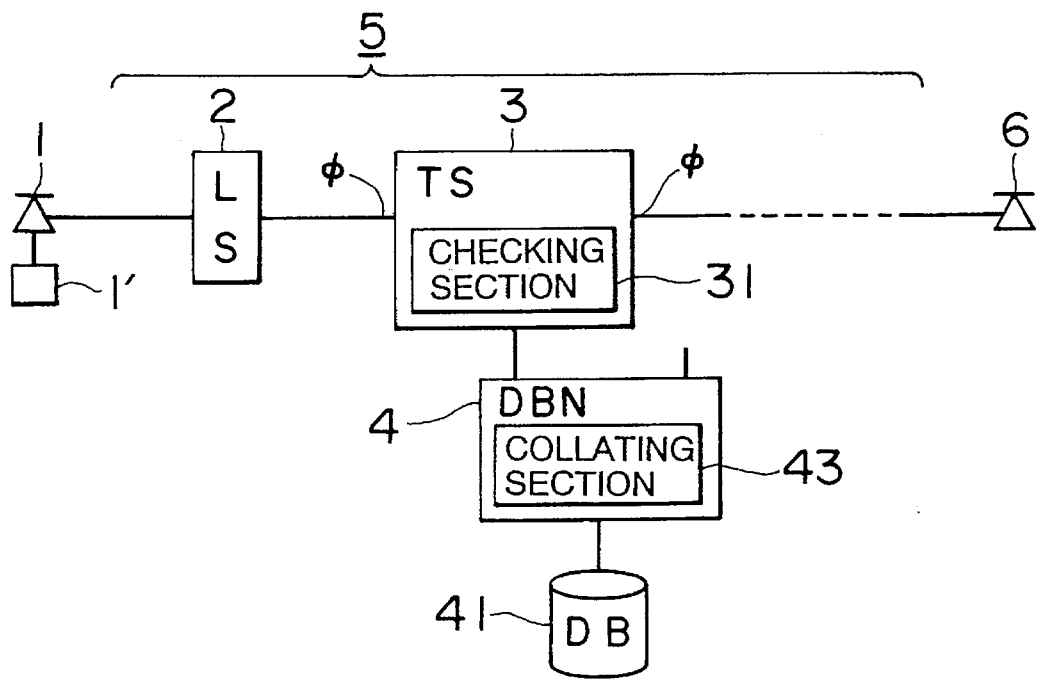
FIG. 2 is a basic block diagram illustrating the switching network of FIG. 1 in greater detail.

FIG. 2 is a basic block diagram illustrating the construction of this embodiment of FIG. 1 in greater detail.

Shown in FIG. 2 are the following elements corresponding to the respective elements of FIG. 1. More specifically, there is illustrated a call originating terminal (1) corresponding to one terminal (100) of FIG. 1. Shown also is a call receiving terminal (6) corresponding to the other terminal (400) of FIG. 1. Shown further is a toll switch (TS) (3) corresponding to the switching system (200) of FIG. 1. There are also depicted a database node (DBN) (4) and a database (DB) which correspond to the data memory (300) of FIG. 1. A checking section (31) serving as the checking section (201) of FIG. 1 is incorporated into the toll switch (TS) (3). A collating section (43) serving as the collating section (301) of FIG. 1 is incorporated into the database node (DBN) (4). A local switch (LS) (2) is, though not shown as a corresponding element in FIG. 1, also illustrated therein.

The switching network (5) is constructed of the local switch (2), the toll switch (3), the database node (4) and the database (41).

It is assumed that the call originating and receiving terminals (1), (6) are, e.g., telephones. The switching network (5) is, it is assumed, an analog telephone network. Then, it is also assumed that the originating terminal (1) is capable of originating a call through a push button.

The service supplier of the switching network (5) (hereinafter simply called "service supplier") previously provides the originating terminal (1) with a peculiar telephone number. Then, in the case of an ordinal call, the service supplier charges the service user for the call on the basis of this identical telephone number. To be more specific, in the case of the private telephone, the service supplier demands the subscriber of the telephone for the call charges added up at a fixed interval. Further, in the case of the public telephone, the service supplier demands the service user for the call charge each time instantaneously or beforehand. Note that a magnetic information reader (1a) for the credit card is connected to the originating terminal (1). The call originator is therefore able to transmits the credit card number by pushing the push button of the originating terminal (1). The call originator is also capable of transmitting the credit card number automatically read by the reader (1a).

Turning to FIG. 2, though only one originating terminal (1) is illustrated, a plurality of terminals (1) are in fact connected to the local switch (2). This local switch (2) has a function to PCM-multiplex and transfer signals transmitted from the plurality of terminals (1) to the toll switch (3) connected thereto. On the other hand, the local switch (2) has a function to restore and transmit the PCM-multiplexed signals sent from the toll switches (3) to the respective terminals. Note that the respective local switches (2) are normally connected to the plurality of toll switches (3).

The plurality of toll switches (3) are provided in the switching network (5). A multiplicity of local switches (2) and other unillustrated toll switches are connected to the respective toll switches (3). Then, one or the plurality of switches are communicated with that special receiving terminal (6). The toll switch (3) selects a proper connection route within the switching network (5) and sets a call between the originating terminal (1) and the receiving terminal (6) in response to a call setting request from the originating terminal (1). The toll switch (3) also adds up the call charges for the set call and informs an unillustrated totaling center of the charges added up.

Further, the toll switch (3) has a checking section (31) for executing the "credit card call services". This checking section (31) checks whether or not the credit card number transmitted from the originating terminal (1) via the local switch (2) has formal requirements. The formal requirements of the credit card herein imply that, for instance, the digit number thereof is proper, the card number contains no inhibition-of-use character, and the card number meets the format based on ISO-7812 pursuant to CCITT Recommendation E118. As a result of the check, if it is confirmed that the formal requirements are met, the checking section (31) collates the credit card number in terms of its validity to the database node (4). Then, in accordance with these checked and collated results, the checking section (31) performs the control to set a call between the originating terminal (1) and the receiving terminal (6), or request the originating terminal for a retransmission of the credit card number or reject the call setting.

Figure 3:
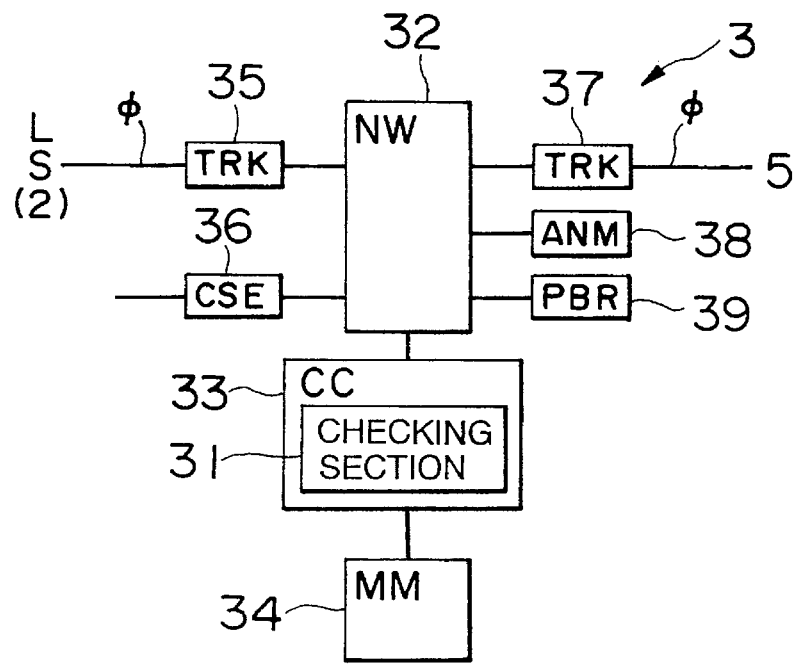
FIG. 3 is a block diagram showing a configuration of a toll switch of FIG. 2.

FIG. 3 illustrates a detailed configuration of the toll switch (3).

The toll switch (3) is constructed of a central controller (CC) (33), a switch system network (NW) (32), trunks (TRK) (35, 37), an announcement machine (ANM) (38), a push-button signal receiver (PBR) (39), a common signaling equipment (CSE) (36) and a main memory (MM) (34) connected to the central controller (33). The central controller (33) controls the operation of the whole toll switch (3). The switch system network (32) includes unillustrated internal signal lines exhibiting a connecting relationship controlled by the central controller (CC). The trunks (35, 37), the announcement machine (38), a push-button signal receiver (39), and common signaling equipment are each connected to a part of the signal lines of this switch system network (32). The switch system network (32) consists of a multiplicity of signal lines connected to the respective elements of the toll switch (3) and a multiplicity of switches for connecting/disconnecting by spatially switching these signal lines. These switches are controlled by the central controller (33), thereby controlling transfers of the signals taken in and out of the respective elements of the toll switch (3).

The central controller (CC) (33) is a control unit incorporating a function of the checking section (31). Then, the central controller (33) controls actions of the respective elements of the toll switch (3), including the above-mentioned switch system network (32).

The main memory (MM) (34) retains a program executed by the central controller (33) and, at the same time, temporarily stores data to be processed therein.

The trunks (35, 37) have other terminals connected to PCM lines (φ) led from the local switch (2) or other toll switch. The trucks are defined as interfaces for connecting the PCM lines φ to the switch system network (32). The number of the trunks corresponds to the total number of the local switches (2) and other toll switches connected to this toll switch (3).

The common signal's equipment (36) is an interface for connecting the database (4) to the network (32).

The announcement machine (38) serves to transmit some selected messages among a plurality of previously sound-recorded voice messages to the respective terminals (1, 6) in conformity with an instruction given from the central controller (33).

A push-button signal receiver (39) converts push-button signals dialed from the respective terminals (1, 6) into digital signals. The receiver (39) then transmits these signals to the processor (33).

Referring back to FIG. 2, the database (41) stores the information on the credit card number of the subscriber who previously makes an application with a desire for using the credit card call services as well as on its validity. The information on the validity thereof includes a password number for which the subscriber has applied and information provided from the credit card company such as, e.g., its validity term, an inhibition-of-use treatment and a usable limit amount, etc.

The database node (4) controls and retrieves the database (41). A collating section (43) incorporated into the database node (4) checks whether or not the credit card number is registered beforehand in the database (41) in accordance with a collation request about the credit card number given from the checking section (31) of the toll switch (3). The collating section (43) also checks, if judged to be registered as a result of the check, whether or not there exist some circumstances to hinder the validity of this credit card on the basis of the information on the validity of the credit card number. Then, the checking section (31) is informed of an answer as a conclusion that the validity is recognized or some other answers (wherein the credit card number is not previously registered, or the credit card number has no validity).

Figure 4:
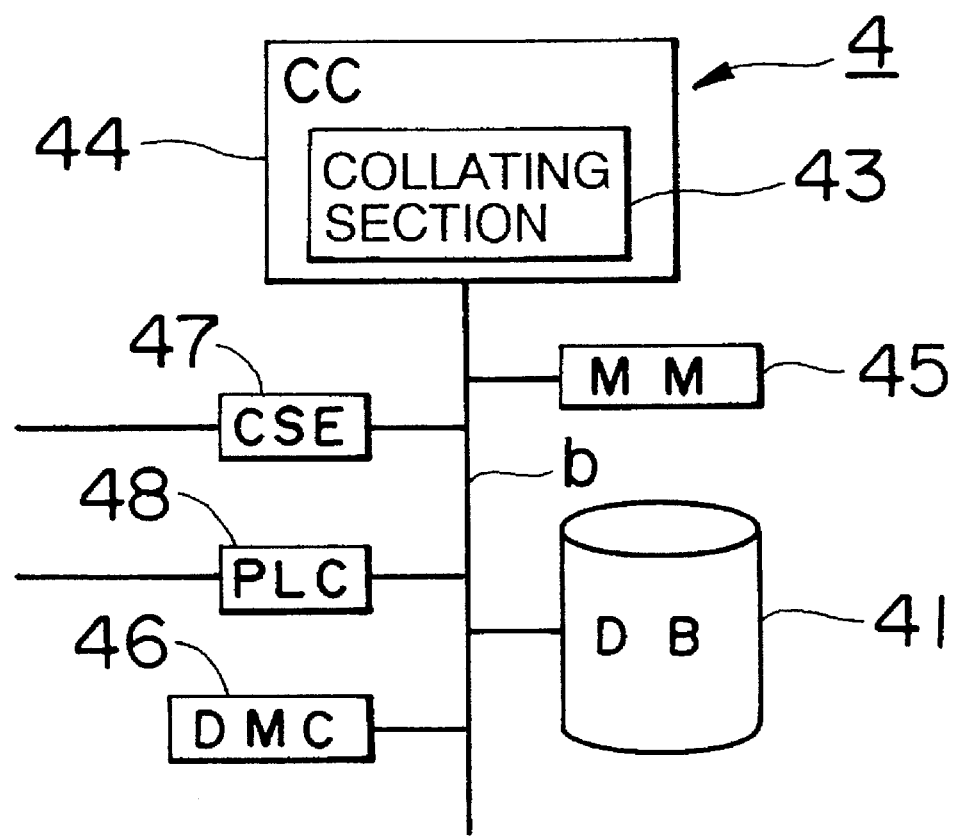
FIG. 4 is a block diagram showing a database node of FIG. 2.

FIG. 4 illustrates detailed configurations of the database node (4) and the database (41).

The database node (4) is constructed of the central controller (CC) (44) for controlling the operation of the whole database node (4), a common signaling equipment CSE (47), a packet link controller (48), a main memory (MM) (45) and a database memory controller (46) which are each connected to a bus line (b) extending from the central controller (44). The database 41 is also connected to this bus line (b).

The central controller (44) includes a function of the collating section (43).

The memory (45) retains a program executed by the central controller (44) and simultaneously stores the data to be processed therein.

The database controller (46) is intended to control the database (41).

The common signaling equipment (47) is an interface for connecting the bus line (b) to the toll switch (3).

The packet link controller (48) is an interface for accessing an unillustrated packet switching network.

Figure 5:
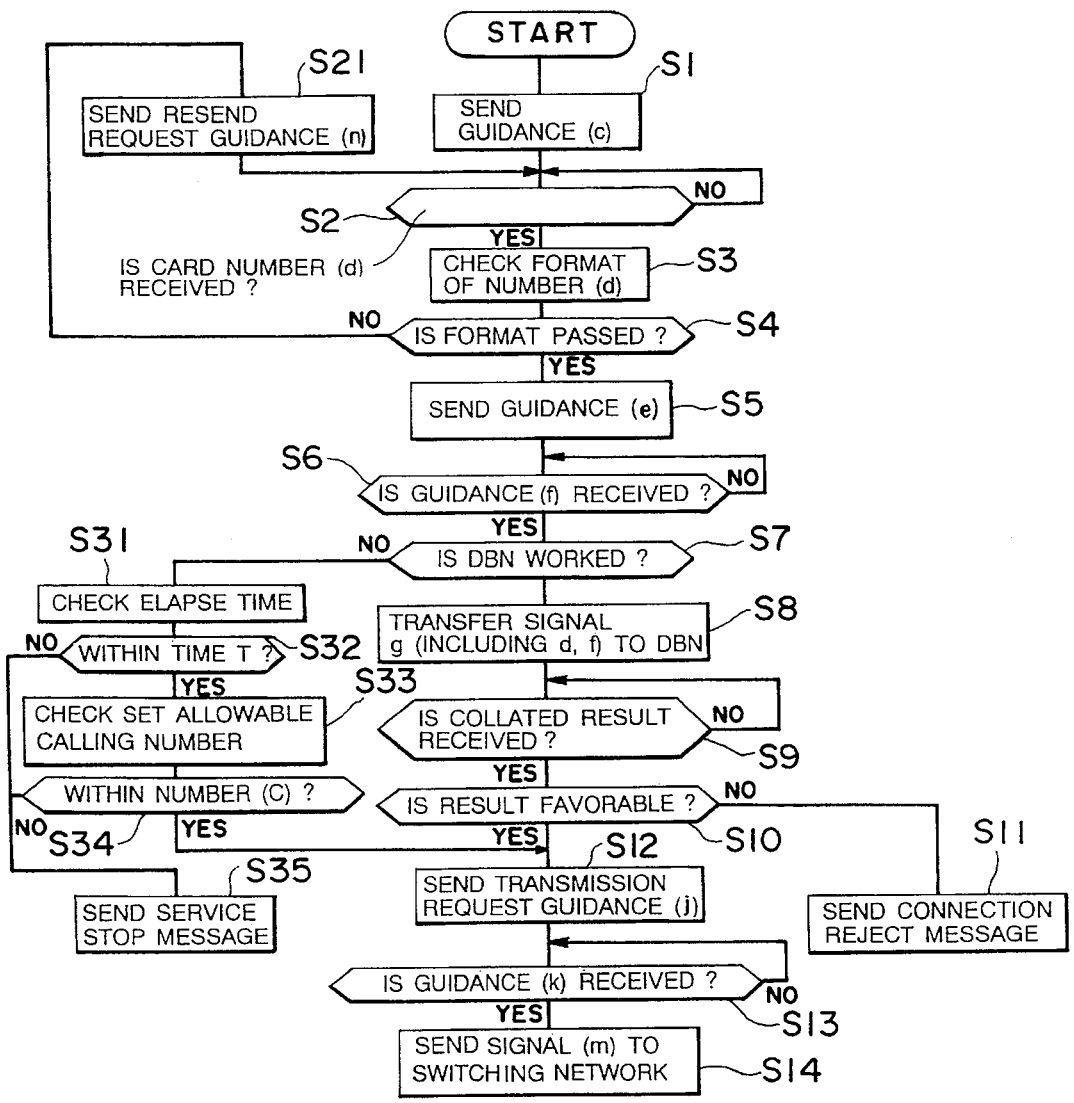
FIG. 5 is a flowchart showing one example of call processing in the toll switch of FIG. 2.
Figure 6:
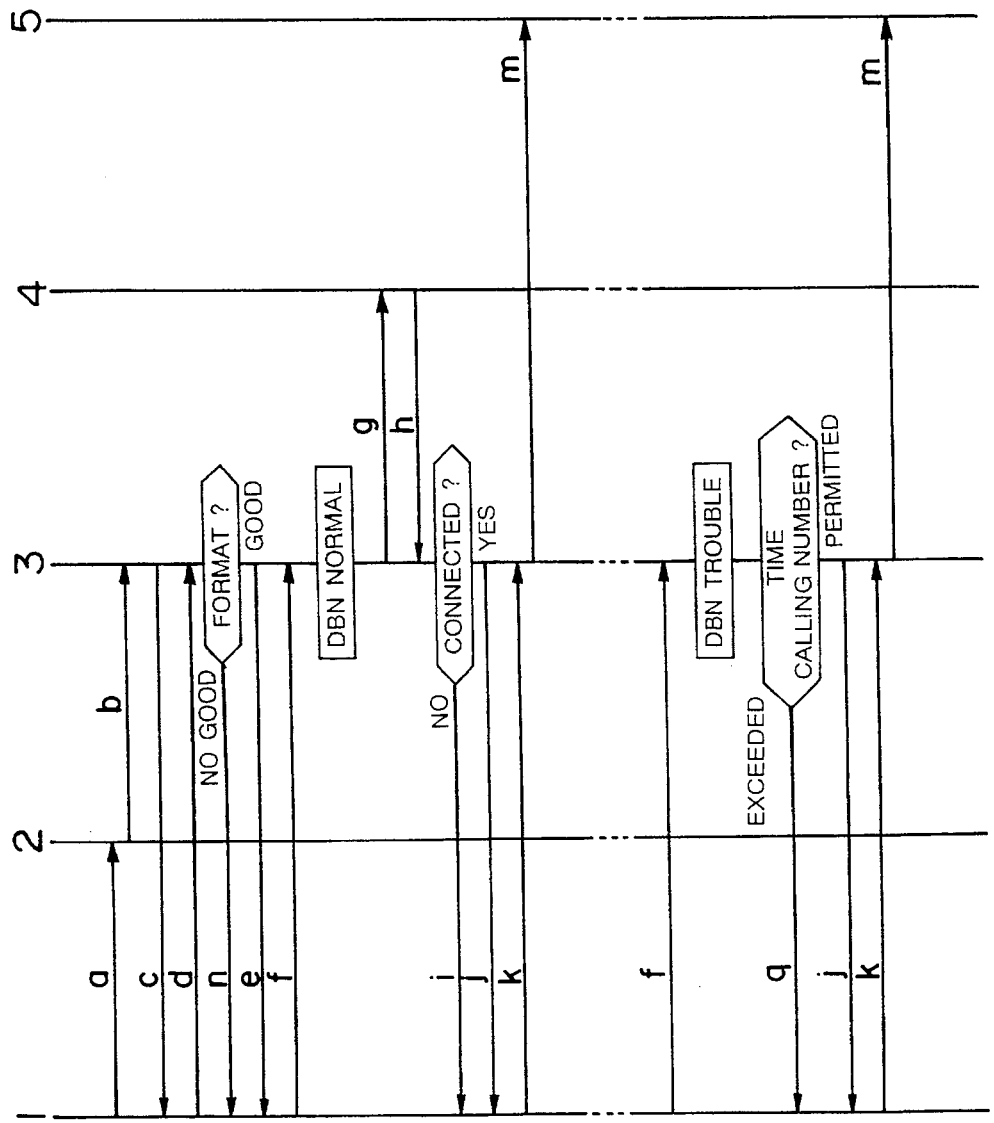
FIG. 6 is a signal diagram showing one example of a signal transmitting process in FIG. 2.
Figure 7:
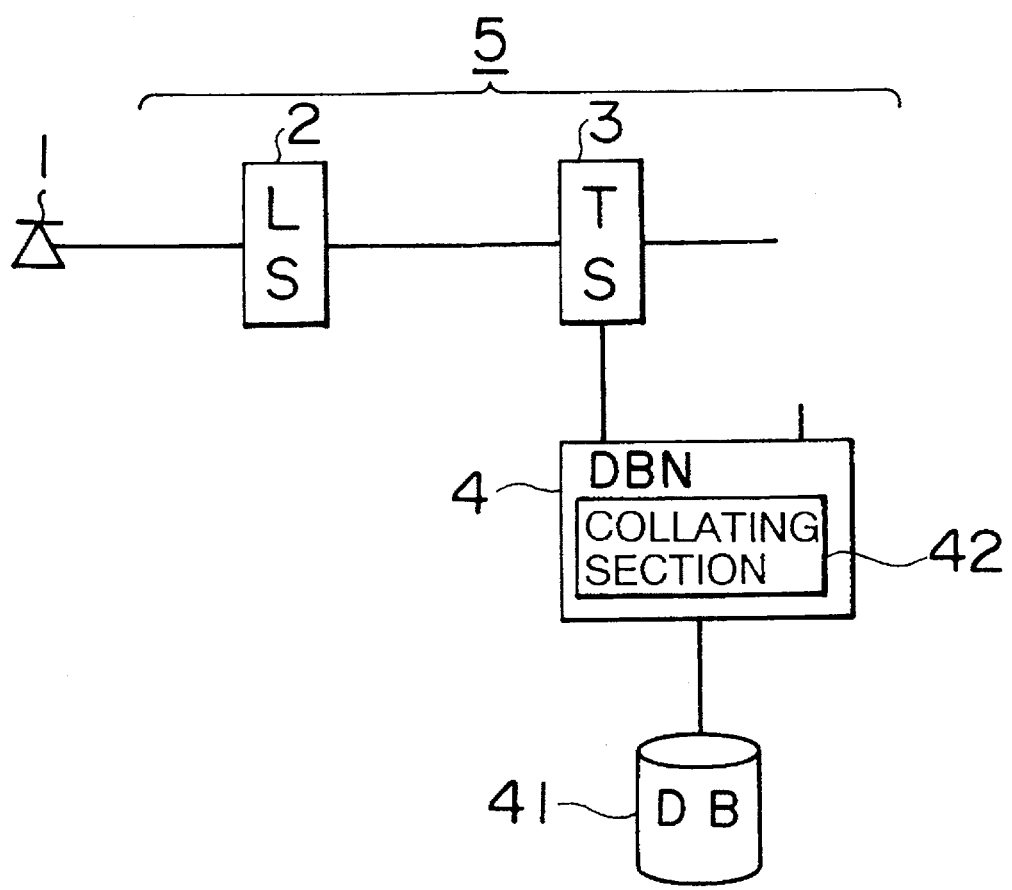
FIG. 7 is a fragmentary view illustrating an example of a typical switching network.

Next, the operation of the embodiment constructed above will be explained with reference to a flowchart of FIG. 5 and a signal diagram of FIG. 6.

The subscriber who desires for setting a credit card call performs an operation such as raising a receiver of the originating terminal (1). Therefore, the originating terminal effects calling. Then, a service special number (a) predetermined for setting the credit card call is dialed. Herein, the service special number (a) is a predetermined information number such as, e.g., "0130". Further, a term "dialing" is herein employed as a concept including a depression of the push button.

The local switch (2) connected to the originating terminal (1) detects calling from the originating terminal (1) and subsequently receives the service special number (a). Then, the local switch (2) selects a route leading to the nearest toll switch (3) among those connected to the local switch (2). Subsequently, this local switch (2) transmits a request signal (b) for a credit card call service to the selected toll switch (3). With the operations given above, the local switch (2) connects the originating terminal (1) to the toll switch (3).

The central controller (33) in the toll switch (3) receives the credit card call service request signal (b) transmitted from the local switch (LS) (2). At this time, the central controller (33) actuates the checking section (31).

The actuated checking section (31) controls the network (32). The checking section (31) then connects the announcement machine (38) and the push-button signal receiver (39) to the trunk (35) and the central controller (33). Thereafter, the processing of the flowchart of FIG. 5 is started.

Then, to start with, the checking section (31) actuates the announcement machine (38) to send a credit card number sending request guidance (c) for requesting the sending of a credit card number (d) (step S1). This guidance (c) is transferred via the local switch (2) to the originating terminal (1). Then, the checking section (31) waits till the credit card number (d) is sent from the originating terminal (1) (step S2).

The subscriber who hears the credit card number sending request guidance (c) transmits the credit card number (d) previously registered in the switching network (5) in the form of a push-button signal from the originating terminal (1). The credit card number (d) is then transferred via the local switch (2) to the toll switch (3).

When the checking section (31) receives the credit card number (d) through a push-button signal receiver (39) in an A/D converted state within the toll switch (step S2). Then, the checking section (31) stops the actuation of the announcement machine (ANM) (38) which is transmitting the credit card number sending request guidance (c). Simultaneously, the checking section (31) executes a format check as to whether or not the credit card number (d) received satisfies the predetermined formal condition (step S3).

The checking section (31), when judging that the credit card number (d) received does not meet the formal condition (step S4), reactuates the announcement machine (ANM) (38) to send a credit card number resending request guidance (n) for requesting the resending of the credit card number (d) (step S21). This guidance (n) is transferred via the local switch (LS) (2) to the originating terminal (1). Then, the checking section (31) waists again for receiving the credit card number (step S2). With this operation, the subscriber is, even if a wrong credit card number is transmitted, capable of correcting the credit card number without disconnecting the call.

Note that the checking section (31), when judging that the credit card number (d) received satisfies the above-mentioned format (step S4) as a result of the formal check in the step S3, actuates again the announcement machine (ANM) (38) to send a password number sending request guidance (e) for requesting the sending of a password number (f) (step S5). This guidance (e) is transferred via the local switch (LS) (2) to the originating terminal (1). Then, the checking section (31) waits till the subscriber sends the password number (f) from the originating terminal (1) (step S6).

The subscriber who hears the password number sending request guidance (e) sends the password number (f) previously registered together with the credit card number in the from of a push-button signal from the originating terminal (1). Then, the password number (f) is transferred via the local switch (2) to the toll switch (3).

In the toll switch (3), the checking section (31), when receiving the password number (f) through the push-button signal receiver (39) in the A/D converted state, stops the actuation of the announcement machine (38) which is sending the password number sending request guidance (e). Thereafter, the checking section (31) checks whether or not the database node (4) properly works (S7). This checking process is done by detecting whether the line leading from the checking section (31) to the database in FIG. 2 is active or not.

As a result of this check, the checking section (31), when confirming that the database node (4) is properly working, transfers a number collation request signal (g) containing the credit card number (d) and the password number (f) received from the originating terminal (1) to the database node (4) via the common signaling equipment (36) (step S8). Then, the checking section (31) waits till a collated result notifying signal (h) is sent back from the database node (4) (step S9).

In the database node (4), the central controller (44) receives the number collation request signal (g) transferred from the toll switch (3) via the common signaling equipment (47). Hereat, the central controller (44) actuates the collating section (43).

Thus actuated collating section (43) refers to the database memory (DB) (41) and makes a collation as to whether the credit card number (d) contained on the number collation request signal (g) transferred from the toll switch (3) is registered beforehand or not. Based on the data previously registered, the collating section (43) then further performs the collation of the validity as to whether or not the transferred password number (f) is identical with the password number previously registered as a password number of the transferred credit card number (d), whether or not the relevant credit card number (d) is within the validity term, whether or not the usable limit amount for use is reached and whether or not the credit card receives a stop-of-transaction treatment.

Then, the collating section (43) sends the collated result notifying signal (h) for notifying a collated result back to the toll switch (TS) (3) via the common signaling equipment (CSE) (47).

In the toll switch (TS) (3), the checking section (31), when receiving the collated result notifying signal (h) sent back from the database node (DBN) (4) (step S9), analyzes the collated result notifying signal (h) (step S10). Then, if the collated result is not favorable (as in cases where the credit card number is not previously registered, or the credit card number is not valid, etc.), the checking section (31) actuates again the announcement machine (ANM) (38) to transmit a connection reject message (i) for rejecting the setting of the credit card call (step S11). This connection reject message (i) is sent back to the originating terminal (1) via the local switch (2). Whereas if the collated result is favorable, the checking section (31) actuates again the announcement machine (ANM) (38) to send a receive telephone number sending request guidance (j) for requesting the sending of a receive telephone number (k) required for setting the credit card call (step S12). This guidance (j) is transferred via the local switch (LS) (2) to the originating terminal (1). Then, the checking section (31) waits till the receive telephone number (k) is sent back from the originating terminal (1) (step S13). Herein, the receiver's telephone number is a telephone number of the remote receiving terminal (6) with which the user desires to talk.

The subscriber who hears the connection reject message (i) gives up the setting of the credit card call, and resets. That is, the subscriber places down the receiver of the originating terminal (1) and stops originating the call.

On the other hand, the subscriber who hears the receiving telephone number sending request guidance (j) sends the receive telephone number (k) in the form of a push-button signal from the originating terminal (1).

The toll switch (TS) (3) which has received the receive telephone number (k) transmits a call setting signal (m) for setting the credit card call to other switches within the switching network (5) which communicates with the receiving terminal (6) in known procedures (step S14).

Then, when a call based on this credit card call is set between the originating terminal (1) and the receiving terminal (6), a talk-time of this call is monitored. The unillustrated accounting center is informed of this talk-time, and the user is charged for this call.

On the other hand, as a result of the check in step S7, the checking section (31), when confirming that the database node (DBN) (4) stops working, measures the time which has elapsed since the database node (DBN) (4) stopped working (step S31). The checking section (31) then checks whether or not the elapse time is within an predetermined allowable time (T) (step S32). Then, if the elapse time is within the allowable time (T) (step S32), the checking section (31) checks whether or not a calling number of the credit card call which has been allowed to be set after the database node (DBN) (4) stopped working is within an allowable calling number (C) (step S33). If within the allowable calling number (C) (step S34), the checking section (31) determines that the credit card call is allowed to be set, and the processes after S12 are to be executed. The following is the reason why such processing is conducted. If the database node (DBN) (4) is expected to be restored for a short period of time, a demerit of setting the call in response to a call request with an invalid credit card number is, it can be considered, smaller than a demerit about lowering of a reliability on the switching network and a profitability caused by rejecting a call request with a valid credit card number.

On the contrary, as a result of the check in step S31, if the elapse time exceeds the allowable time (step S32); or alternatively, as a consequence of the check in step S33, if the calling number of the credit card call allowed to be set after the database node (DBN) (4) has stopped working exceeds the predetermined allowable calling number (C) (step S34), the checking section (31) does not set the call. Subsequently, the checking section (31) actuates again the announcement machine (38) to send a service stop message (o) indicating that the switching network (5) stop the credit card service (step S35). This message (o) is transferred via the local switch (2) to the originating terminal (1). This is intended to prevent an increase in damage due to the call setting without executing any collation of the credit card number (d) and the password number (f) through the database node (4).

As obvious from the description given above, according to this embodiment, the checking section (31) within the toll switch (3) checks the format of the credit card number (d) sent by the subscriber (1) who desires setting of the credit card call. Then, the number collation request signal (g) is not transferred to the database node (4) till the result of the format check becomes satisfactory. Hence, a load on the database node (4) is remarkably relieved, and the time necessary for setting the credit card call is also remarkably reduced. The capacity of the switching network is thereby increased.

Besides, even when the function of the database node (4) is stopped, a request for the credit card call induced within an after-stop-of-function allowable time (T) is allowed to be set. The request for the credit card call is allowed to be set till the number of setting call reaches the allowable calling number (C). Accordingly, even if the database node (4) stops functioning, a complete stop of the credit card services can be prevented.

Note that FIGS. 2 through 6 illustrate nothing but one embodiment of the present invention, and the construction can be modified by the one skilled in the art without harming the essence of the invention.

For instance, an approval of the setting the credit card call in the event of the functional stop of the database node (4) is not limited to the checking through both the allowable time (T) and the allowable calling number (C). Many other modifications may be considered as checked through any one of the above-mentioned. In any case, however, the effects of the present invention remain unchanged.

Further, the constructions of the switching network (5), the toll switch (3) and the database node (4) are not limited to those illustrated. A variety of other modifications can be considered. In any case, however, the effects of the present invention do not change.

Besides, the ID information of the service user to be charged, at which the present invention aims, is not confined to the credit card number (d). Many other modifications may be conceived as in the form of a bank deposit account number, or a telephone number (DN) other than the call originating subscriber (1), e.g., a receive telephone number, or a telephone number of the predetermined third party, and so on. In any case, however, the present invention still exhibits the effects unchanged.

As discussed above, according to the present invention, the switching network works to check whether or not the service user's information designated by the call originating subscriber satisfies the predetermined formal requirement in the switch system. Therefore, the load on the side of the data memory is relieved. It is therefore possible to remarkably decrease the time required for setting the call concomitant with the request for imposing the charges in accordance with the service user's information. Hence, the capacity of the switching network can be well utilized, and the reliability can be kept.

Note that even when the data memory stops functioning due to troubles, the serviceability and reliability of the switching network can be maintained by permitting the setting of the call with the service user's information satisfying the predetermined format within a fixed range.

It is apparent that, in this invention, a wide range of different working modes can be formed based on the invention without deviating from the spirit and scope of the invention. This invention is not restricted by its specific working modes except being limited by the appended claims.

We claim:

1. An apparatus for verifying the information of a service user to be charged in a switching network having a switch system for setting a call requested by one terminal between other terminal and said one terminal and a data memory for retaining service user's information previously designated by a subscriber and information on a validity of said service user's information, wherein said data memory includes a collating means for collating the validity of said service user's information, said switch system includes a checking means for checking whether or not a service user's information transmitted via said one terminal satisfies a predetermined formal condition and requesting, if said condition is satisfied, said data memory for the collation of the validity of said service user's information, and said switch system sets, when said collating means recognizes the validity of said service user's information, a call to be charged based on said information between said one terminal and said other terminal, and wherein said checking means permits setting of a call to be charged based on said information in response to a request for setting said call produced within a predetermined time after said collating means has stopped collating of the validity of said user's information, under condition that said information meets said predetermined formal condition.

2. The apparatus according to claim 1, wherein said one terminal is a telephone.

3. The apparatus according to claim 2, wherein said one terminal has a peculiar telephone number.

4. The apparatus according to claim 1, wherein a charge to be imposed is a charge for using the line.

5. The apparatus according to claim 1, wherein said service user's information previously designated by said subscriber is a credit card number.

6. The apparatus according to claim 5, wherein said one terminal having a reader for reading said credit card number from said credit card.

7. The apparatus according to claim 1, wherein said service user's information previously designated by said subscriber is a bank deposit account number.

8. The apparatus according to claim 3, wherein said service user's information previously designated by said subscriber is a telephone number different from that of said one terminal.

9. The apparatus according to claim 1, wherein said service user's information previously designated by said subscriber involves the use of a telephone number of a predetermined subscriber other than said subscriber.

10. The apparatus according to claim 1, wherein said predetermined formal condition for said service user's information includes the fact that a number of characters of said service user's information is same as predetermined number.

11. The apparatus according to claim 5, wherein said information on the validity of said service user's information retained by said data memory is information on a password number, a validity term of said credit card, a usable limit amount, and/or an inhibition-of-use treatment.

12. The apparatus according to claim 1, wherein said data memory retains said password number as said information on the validity about said service user's information, said collating means relies an negative answer to said switch system if said password number transmitted from said one terminal together with said service user's information is not identical with said password number retained in said data memory as a password number corresponding to said service user's information.

13. The apparatus according to claim 1, wherein said collating means relies to a negative answer to said switch system if said data memory does not previously retain said service user's information received by said switch system.

14. The apparatus according to claim 1, wherein said checking means, when said service user's information does not satisfy said formal condition, requests said one terminal to resend said service user's information.

15. An apparatus for verifying the information of a service user to be charged in a switching network having a switch system for setting a call requested by one terminal between other terminal and said one terminal and a data memory for retaining service user's information previously designated by a subscriber and information on a validity of said service user's information, wherein said data memory includes a collating means for collating the validity of said service user's information, said switch system includes a checking means for checking whether or not a service user's information transmitted via said one terminal satisfies a predetermined formal condition and requesting, if said condition is satisfied, said data memory for the collation of the validity of said service user's information, and said switch system sets, when said collating means recognizes the validity of said service user's information, a call to be charged based on said information between said one terminal and said other terminal, and wherein said checking means permits setting of a call to be charged based on said information in the order of arrival till a predetermined number is reached with respect to requests of setting said call with said information satisfying said formal condition after said collating means has stopped collating of the validity of said service user's information.

16. A method of verifying the information of a service user to be charged in a switching network having a switch system for setting a call requested by one terminal between other terminal and said one terminal and a data memory for retaining service user's information previously designated by a subscriber and information on a validity of said service user's information, the method comprising:

checking whether or not said service user's information sent from said one terminal satisfies a formal condition in said switch system, collating said service user's information on the basis of said information retained by said data memory in said data memory when said service user's information satisfies said formal condition as a result of said checking, setting a call to be charged based on said information between said one terminal and said other terminal when recognizing that said service user's information is previously retained by said data memory and has a validity as a result of said collation, wherein said switch system permits setting of call to be charged based on said information on condition that said service user's information satisfies said formal condition in response to a request for setting the call produced within a predetermined time if a collating means of said data memory stops collating of said service user's information.

17. A method of verifying the information of a service user to be charged in a switching network having a switch system for setting a call requested by one terminal between other terminal and said one terminal and a data memory for retaining service user's information previously designated by a subscriber and information on a validity of said service user's information, the method comprising:

checking whether or not said service user's information sent from said one terminal satisfies a formal condition in said switch system, collating said service user's information on the basis of said information retained by said data memory in said data memory when said service user's information satisfies said formal condition as a result of said checking, setting a call to be charged based on said information between said one terminal and said other terminal when recognizing that said service user's information is previously retained by said data memory and has a validity as a result of said collation, wherein setting a call to be charged based on said information in the order of arrival till a predetermined number is reached, is permitted on condition that said service user's information satisfies said formal condition in response to a request for setting said call when a collating means of said data memory stops collating of said service user's information.

18. The apparatus according to claim 15, wherein said one terminal is a telephone.

19. The apparatus according to claim 18, wherein said one terminal has a peculiar telephone number.

20. The apparatus according to claim 15, wherein a charge to be imposed is a charge for using the line.

21. The apparatus according to claim 15, wherein said service user's information previously designated by said subscriber is a credit card number.

22. The apparatus according to claim 21, wherein said one terminal having a reader for reading said credit card number from said credit card.

23. The apparatus according to claim 15, wherein said service user's information previously designated by said subscriber is a bank deposit account number.

24. The apparatus according to claim 19, wherein said service user's information previously designated by said subscriber is a telephone number different from that of said one terminal.

25. The apparatus according to claim 15, wherein said service user's information previously designated by said subscriber involves the use of a telephone number of a predetermined subscriber other than said subscriber.

26. The apparatus according to claim 15, wherein said formal condition for said service user's information includes the fact that a number of characters of said service user's information is same as predetermined number.

27. The apparatus according to claim 21, wherein said information on the validity of said service user's information retained by said data memory is information on a password number, a validity term of said credit card, a usable limit amount, and/or an inhibition-of-use treatment.

28. The apparatus according to claim 15, wherein said data memory retains said password number as said information on the validity about said service user's information, said collating means relies an negative answer to said switch system if said password number transmitted from said one terminal together with said service user's information is not identical with said password number retained in said data memory as a password number corresponding to said service user's information.

29. The apparatus according to claim 15, wherein said collating means relies to a negative answer to said switch system if said data memory does not previously retain said service user's information received by said switch system.

30. The apparatus according to claim 15, wherein said checking means, when said service user's information does not satisfy said formal condition, requests said one terminal to resend said service user's information.

* * * * *